(12) United States Patent
Fraas et al.

(10) Patent No.: US 8,487,180 B1
(45) Date of Patent: Jul. 16, 2013

(54) PRE-FABRICATED ROOF-MOUNT SUN-TRACK PV CAROUSEL

(75) Inventors: Lewis M. Fraas, Issaquah, WA (US); Leonid Minkin, Seattle, WA (US)

(73) Assignee: JX Crystals Inc., Issaquah, WA (US)

( * ) Notice: Subject to any disclaimer, the term of this patent is extended or adjusted under 35 U.S.C. 154(b) by 1007 days.

(21) Appl. No.: 12/070,791

(22) Filed: Feb. 21, 2008

Related U.S. Application Data

(60) Provisional application No. 60/902,607, filed on Feb. 22, 2007.

(51) Int. Cl.
*H01L 31/0232* (2006.01)

(52) U.S. Cl.
USPC ............ 136/246; 136/243; 136/244; 136/251

(58) Field of Classification Search
USPC ................................................. 136/243–248
See application file for complete search history.

(56) References Cited

U.S. PATENT DOCUMENTS

| | | | | |
|---|---|---|---|---|
| 4,223,174 A | * | 9/1980 | Moeller | 136/246 |
| 4,620,771 A | * | 11/1986 | Dominguez | 359/591 |
| 5,338,369 A | * | 8/1994 | Rawlings | 136/246 |
| 6,967,278 B2 | * | 11/2005 | Hatsukaiwa et al. | 136/251 |
| 7,574,842 B2 | * | 8/2009 | Russell | 52/768 |
| 2004/0187907 A1 | * | 9/2004 | Morgal | 136/246 |

* cited by examiner

*Primary Examiner* — Jennifer Michener
*Assistant Examiner* — Matthew Martin
(74) *Attorney, Agent, or Firm* — James Creighton Wray

(57) ABSTRACT

A one-axis azimuth sun-tracking carousel where the PV panels are mounted at a fixed tilt in operation can be mounted on a flat roof building without roof penetration and without risk of wind damage. The carousel is prefabricated and sized to carry the maximum power while still fitting in a standard shipping container. Panel support arms fold down for shipping or in the event of a hurricane to make the carousel less than 9 inches high. Because this carousel is prefabricated and compact, it can be easily hoisted up on a roof for rapid low-cost installation. Wind skirts provide low wind resistance in high wind situations during normal operation. In order to survive high winds without roof penetration, wire tether tie points allow several carousels in an array to be tethered together and to the building parapet walls.

19 Claims, 4 Drawing Sheets

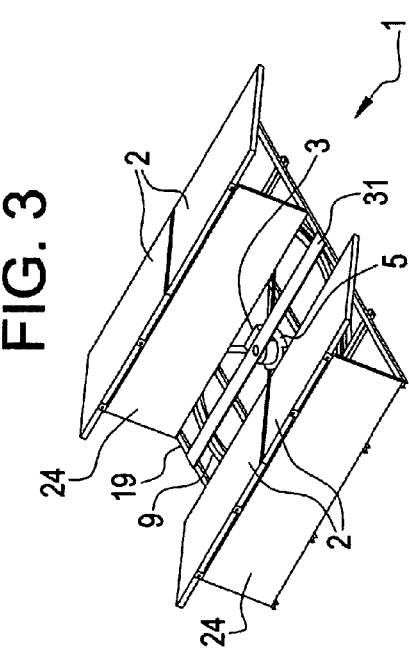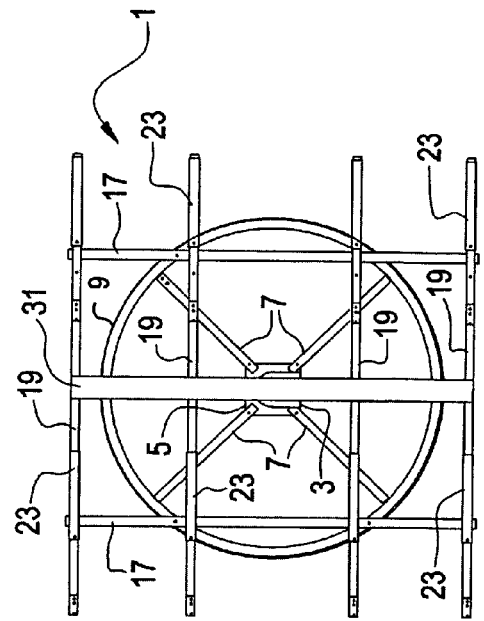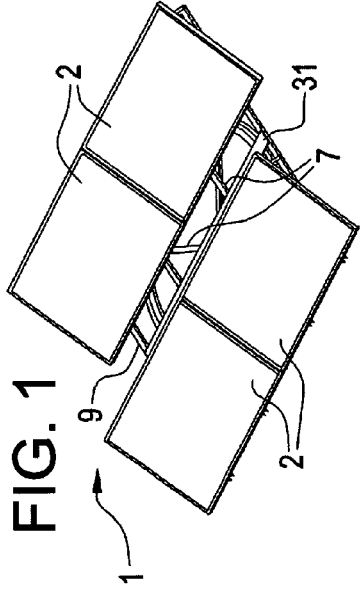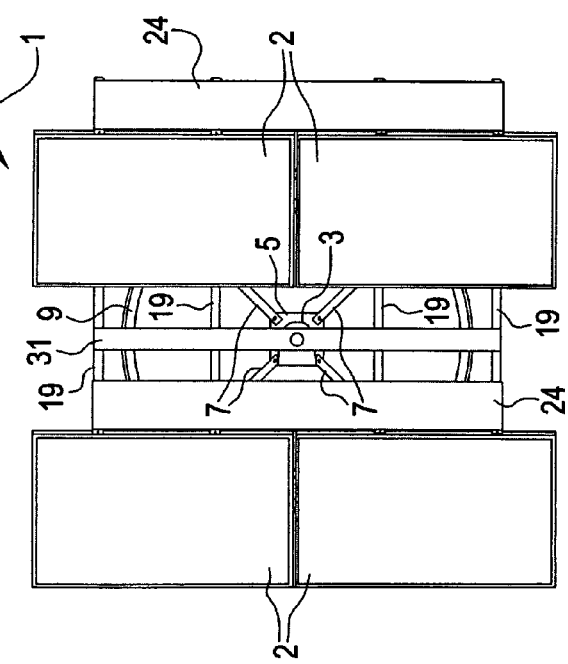

FIG. 5
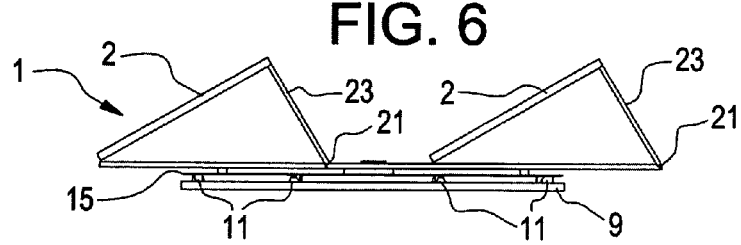
FIG. 6
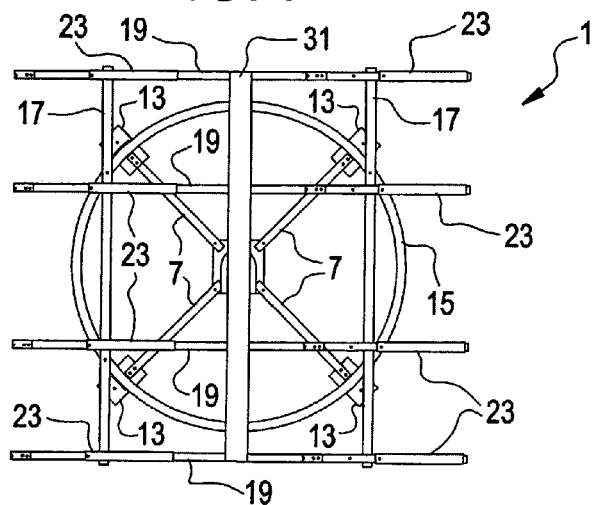
FIG. 7
FIG. 8
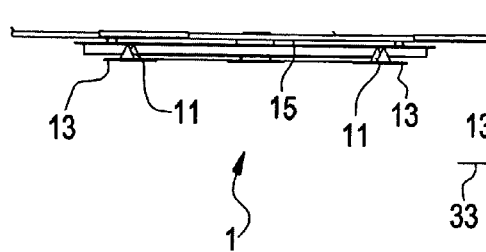
FIG. 9
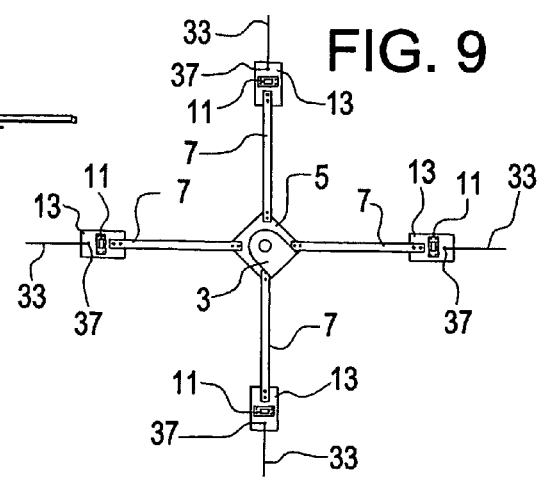

PRE-FABRICATED ROOF-MOUNT SUN-TRACK PV CAROUSEL

This application claims the benefit of U.S. Provisional Application No. 60/902,607, filed Feb. 22, 2007, which is hereby incorporated by reference in its entirety.

FIELD OF THE INVENTION

The present invention relates to the field of solar photovoltaic panel carousels.

BACKGROUND OF THE INVENTION

While it is now well recognized that sun trackers used with solar photovoltaic (PV) panels can produce as much as 40% more or 1.4 times the kWh of electricity per kW of installed panel power relative to fixed flat non-tracking panels, solar trackers are being used primarily in ground mounted systems.

Presently, the three primary markets for solar PV panels are for homes, utility fields, and commercial buildings. Homes use primarily fixed roof mounted panels and utility fields are starting to use ground mounted sun trackers.

Commercial flat rooftop buildings have traditionally also used panels mounted fixed and nearly flat on their rooftops. The fixed nearly flat mounting systems for commercial building flat rooftops have been preferred because of a desire to avoid roof penetrations, concerns over effects of high winds, and a desire for easy, low cost, and rapid installation.

There is a need for improved sun tracking systems.

SUMMARY OF THE INVENTION

The present invention is an azimuth sun-tracking carousel that can be mounted on a flat roof building without roof penetration and without risk of wind damage and with rapid low cost installation. A desirable feature of a carousel is that it distributes its weight evenly over a large roof area. While sun-tracking carousels have been described previously, this carousel has several unique and desirable features specifically designed for low wind resistance and rapid low-cost rooftop installation.

The carousel is prefabricated and sized to fit in a standard shipping container. Therefore, its width is between 85 and 92 inches and its length is between 105 and 130 inches. It is sized to be as large as possible in order to carry as much power as possible but still fit snugly in a shipping container.

For simplicity and low fabrication cost, it is a one-axis azimuth tracker where the PV panels are mounted at a fixed tilt in operation. However, it has panel support arms that swivel and fold down for shipping so that the carousel is 9 inches high or less in its shipping configuration. This fold down feature also allows the panels to be folded down horizontal in the event of a hurricane or typhoon.

Because this carousel is prefabricated and compact, it can be easily hoisted up on a roof for rapid low-cost installation.

For low wind resistance and safe survival in high wind situations during normal operation, it is equipped with wind skirts. Wind forces push down and cannot lift it off the roof.

In order to avoid roof penetration but still survive in high winds, wire tether tie points are provided so that several carousels in an array can be tethered together and then wire tethered to the building parapet walls.

A new roof-mounted sun-tracking carousel for solar PV panels has foldable PV panel support arms that are raised to support PV panels during normal operation and lowered to reduce the total height of the carousel for shipping or in inclement weather. The total height of the carousel is less than nine inches when the PV panel support arms are lowered. The carousel also has tether tie points. The carousel may be tethered by one of the tether tie points to another carousel or to a roof-top structure. The carousel has long channels and perpendicular short channels, the length of the long channels is the length of the carousel and the length of the short channels is the width of the carousel, and the short channels are less than 92" long and the long channels are less than 130" long. The foldable PV panel support arms are mounted on the long channels, two on each long channel, to allow two rows of PV panels to be mounted on the carousel. The short channels are long enough to support the combined length of two or more PV panels and the long channels are greater than 105" long to minimize shading of the second row of PV panels by the first row of PV panels.

Bypass diodes protect horizontal cell rows so that, when the lower edge of a panel is shaded, the upper cell rows will still generate power. The carousel has a one-axis azimuth drive and the panel tilt is fixed. Back module brackets are mounted on the ends of foldable PV panel support arms and front module brackets are mounted on long channels and the back and front module brackets attach to opposite ends of mounted PV panels.

A new roof-mounted sun-tracking carousel for solar PV panels has an azimuth drive motor located at its center on a base plate that sits flat when the carousel is placed on a roof. Four legs extend from this base plate in four directions and rest on the roof when the carousel is placed there. The carousel also has a base with a set of wheels and a rotating angle-ring with leg-out riding on top of the wheel set. Two short channels are attached to the rotating angle-ring and four long channels are attached perpendicular to the two short channels. Hinges and foldable PV panel support arms, two per long-channel, are attached to the four long channels. A bypass diode configuration protects horizontal cell rows and tether tie-points are located on a stationary portion of the carousel. A drive bar runs between a drive motor drive shaft at the carousel center and the long channels. PV panels can be mounted on the PV panel support arms, which lower to reduce height of the carousel for shipping or inclement weather. The short channels are less than 92" long and the long channels are less than 130" long.

The total height of this carousel may be nine inches or less when the PV panel support arms are lowered. In one embodiment, the carousel includes back module brackets mounted on the ends of foldable PV panel support arms and front module brackets mounted on long channels. The back and front module brackets attach to opposite ends of mounted PV panels. The azimuth drive motor is a one-axis azimuth drive motor and the panel tilt is fixed.

In one embodiment, the base with a set of wheels is a leg-in angle ring that the legs connect to, upon which wheels are mounted face up around a circle. In another embodiment, the base with a set of wheels is made up of four base plates 90° apart with a wheel facing up on each base plate.

The carousel may also have wind skirts, tar placed under the base with a set of wheels, or bricks placed on the base with a set of wheels or the base plate in order to keep the carousel from shifting in high winds.

A new method of installing the new carousel involves shipping the carousel to an installation location with the PV panel support arms lowered to minimize its height, hoisting the carousel and PV panels to the top of a roof, placing the carousel in the desired position on the roof-top, raising the PV panel support arms and installing PV panels on the carousel, and tethering the carousel to a roof-top structure.

These and further and other objects and features of the invention are apparent in the disclosure, which includes the above and ongoing written specification, with the drawings.

BRIEF DESCRIPTION OF THE DRAWINGS

FIG. 1 shows a top front perspective view of the carousel showing 4 PV panels in a 2-row configuration with 2 panels per row.

FIG. 2 shows a top view of the carousel.

FIG. 3 shows a top back view of the carousel where the wind skirts and central azimuth drive motor are clearly visible.

FIG. 4 shows a top view of the carousel without PV panels in its prefabricated shipping configuration.

FIG. 5 shows a side view of the carousel without PV panels in its prefabricated shipping configuration.

FIG. 6 shows a side view of the carousel after it has been hoisted onto the roof and the panel support arms have been elevated and the panels have been installed.

FIG. 7 shows a top view of a carousel in an alternate embodiment with a 4 wheel base configuration.

FIG. 8 shows a side view of the four wheel carousel embodiment without PV panels in its prefabricated shipping configuration.

FIG. 9 shows a top view of the carousel drive-motor, legs, wheels, and wheel base plates.

DETAILED DESCRIPTION OF THE PREFERRED EMBODIMENTS

Figure 10:
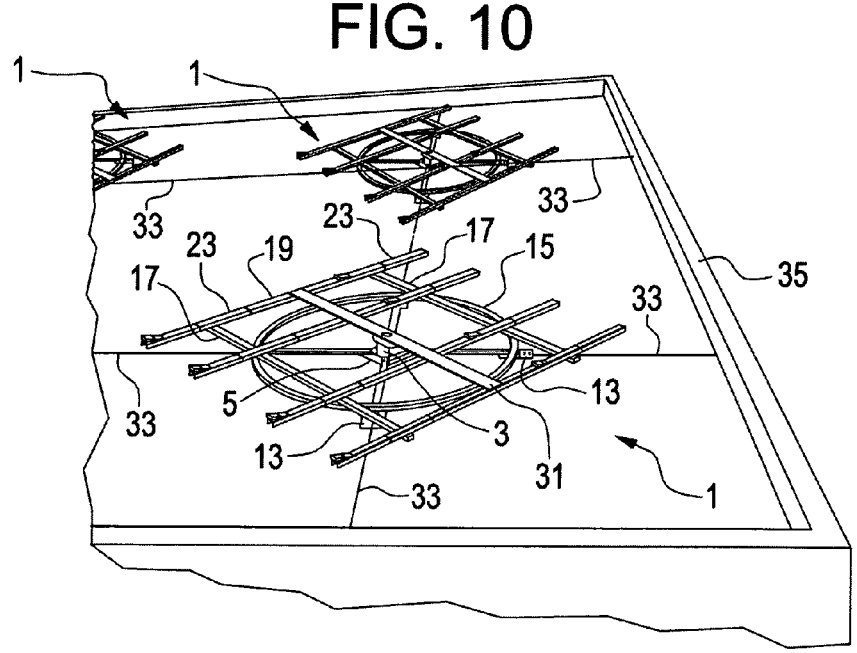
FIG. 10 shows several carousels after mounting on a building rooftop tethered together and to the building parapets before PV panels are mounted.

In the several figures, like reference numerals refer to like parts having like functions.

The carousel shown in FIGS. 1 to 11 is designed to carry four commercially available PV panels 2. These panels range in power output from 170 W to 315 W. So each carousel can produce between 680 W up to 1260 W. The panel physical dimensions range from 31" to 45" in width and between 58" to 77" in length.

The carousel 1 itself consists of an azimuth drive motor 3 located at its center on a base plate 5 sitting flat on the roof. Four legs 7 extend out from this base plate in four directions along the roof to a base with a set of wheels. In one embodiment shown in FIGS. 1 to 6, the legs 7 connect to a leg-in angle ring 9 upon which eight wheels 11 are mounted facing up and at 45 degrees apart around a circle. In a second embodiment shown in FIGS. 7 to 11, the legs connect to four base plates 13 90 degrees apart with a wheel 11 facing up on each base plate (see FIG. 9).

An angle ring with leg-out 15 rides on top of the wheel set. As can be clearly seen in FIGS. 4 and 7, two shorter cross channels 17 are attached to this rotating angle ring and four longer channels 19 are then attached perpendicular to these two cross channels. Hinges 21 and panel support arms 23, two per long-channel, are attached to the four long channels and the PV panels 2 are to be attached astride these long channels as shown in FIGS. 1, 2, 3, and 6. Plates 24 can be attached to support arms 23 as in FIGS. 2 and 3.

In the prefabricated carousel configuration during shipping, the panel support arms are folded down flat to minimize carousel height minimizing shipping volume as shown in FIGS. 5 and 8. Note that the panel support arms are folded down flat in FIG. 5. In FIG. 5 the embodiment shown has an 8-wheel-base configuration. In FIG. 8 the embodiment shown has four wheels 11 clearly visible.

Figure 11:
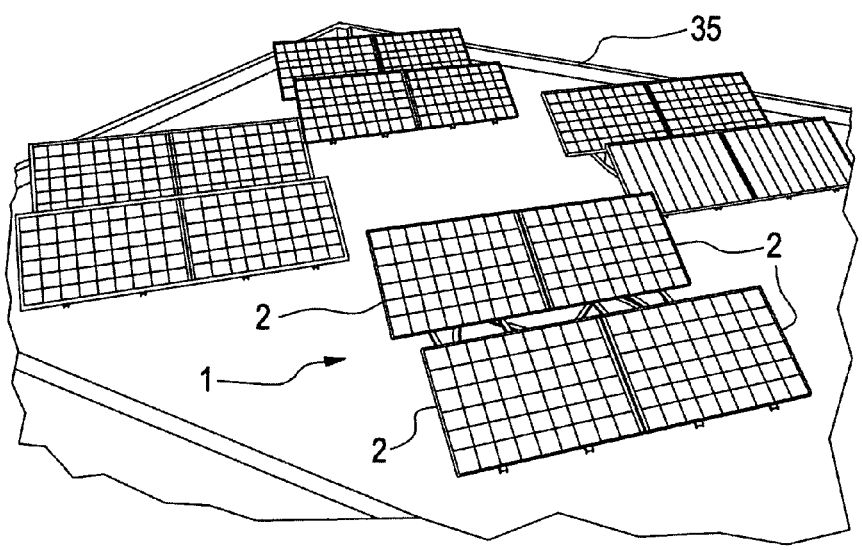
FIG. 11 shows a carousel array with PV panels operating on a commercial building flat rooftop.

Upon arrival at the building where the installation is to occur, the carousels are then hoisted up to the roof, tethered together as shown in FIG. 10, and then the panel support arms are lifted and the PV panels installed as in FIG. 11. A sun sensor is also installed atop a back row PV panel and connected to a motor drive controller. This sun-sensor and control system is not shown or described here as it is similar to that already used in azimuth sun trackers in ground mounted systems.

Figure 13:
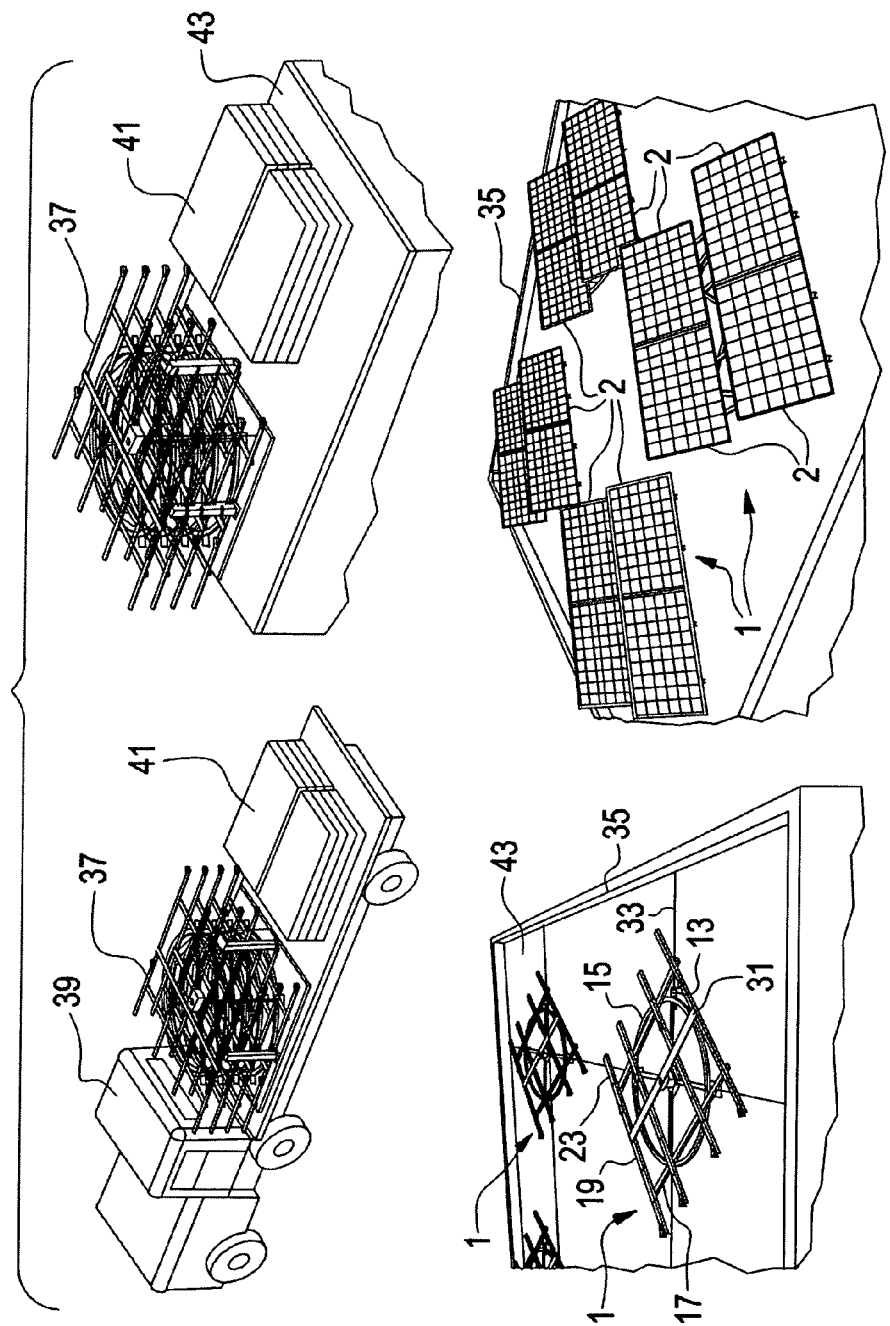
FIG. 13 shows a carousel shipment and installation sequence.

FIG. 13 shows a carousel shipment and installation sequence. Flat carousels with folded down support arms may be shipped in a stack 37 on a flat bed truck 39. A stack of PV panels 41 may be transported simultaneously on the truck. The stacks are hoisted up to the rooftop 43. The carousels 1 are deployed around the rooftop 43 and tethered 33 to one another and to the rooftop parapet 35. The support arms 23 are raised and PV panels 2 are mounted on the carousels.

Figure 12:
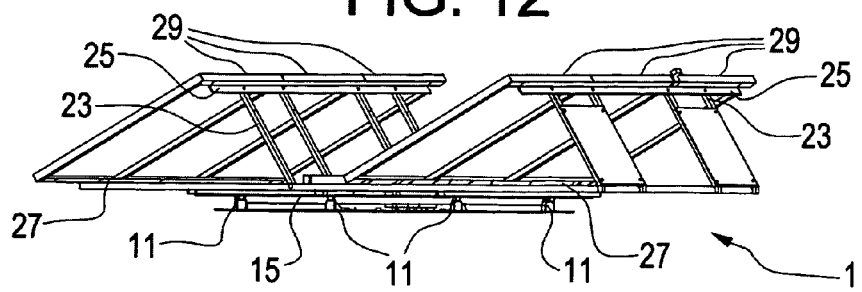
FIG. 12 shows a side-back 45 degree view of a carousel with the addition of back module bracket and front module bracket allowing three modules per row.

In another embodiment shown in FIG. 12, after the up to 92" wide carousel is hoisted up on the roof, back module brackets 25 and front module brackets 27 can be added to
1. accommodate a variety of different modules featuring different mounting hole patterns;
2. allow for example six narrow modules 29 instead of four modules;
3. simplify assembly in the field (on a roof).

FIG. 12 shows a side-back 45 degree view of a carousel with the addition of back module bracket 25 and front module bracket 27 allowing three narrow modules 29 per row.

The lengths of the long and short channels 19, 17 are critical. The short channel 17 length is close to but less than 92", the internal width of a shipping container. But it is long enough to support the combined length of two (or more) PV panels 2 which is at most 155". The length of the long channels 19 is also critical being less than 130". These channels should be long enough to allow two panel rows including sufficient space between the rows to minimize shading of the back row by the front row. Also, the bypass diode configuration in the panels is important. The bypass diodes should protect horizontal cell rows rather than vertical cell rows in the panels. With protection by horizontal row, when the lower edge of a panel is shaded, the upper cell rows will still generate power.

The last component in the description of this carousel is a drive bar 31 that runs between the drive motor drive shaft at the carousel center to the rotating ring and cross channels as shown in FIGS. 4 and 7.

As shown in FIGS. 9 and 10, there is a provision for tether wires 33 connected to tie points 37 at the stationary outer perimeter of the carousel to secure an array of carousels to the building parapet 35 for survival of the array in high winds. FIG. 9 shows a top view of the carousel drive-motor 3, legs 7, wheels 11, and wheel base plates 13. The rotating ring with panel-rack is not shown. Tether wires 33 are shown with tie points 37 to the carousel base.

Alternate methods of wind protection are also possible depending on the actual rooftop situation. For example, in some cases, it may be possible to simply use tar under the wheel pads to attach the carousel to the rooftop. Alternately, bricks can be set on the wheel pads and drive motor base plate as ballast against carousel movement caused by the wind. While the invention has been described with reference to specific embodiments, modifications and variations of the invention may be constructed without departing from the scope of the invention.

We claim:

1. A solar photovoltaic panel carousel mount comprising first and second parts, the first part having a roof-mounted base plate positioned on a roof, arms radiating and extending from the base plate, the arms having inner ends connected to the base plate and outer ends spaced from the base plate, and upward facing wheels mounted on the outer ends of the arms, the second part further comprising a sun-tracking carousel having a rotatable angle ring mounted on the upward facing wheels, crossed channels mounted on the angle ring, hinges attached to the channels for solar PV panels, further comprising foldable PV panel support arms that are raised to support PV panels during normal operation and lowered to reduce the total height of the carousel for shipping or in inclement weather.

2. The carousel mount of claim 1, wherein the total height of the carousel is approximately nine inches or less when the PV panel support arms are lowered.

3. The carousel mount of claim 1, further comprising tether tie points on the arms.

4. The carousel mount of claim 3, wherein the carousel mount is tethered by one of the tether tie points to another carousel mount or to a roof-top structure.

5. The carousel mount of claim 1, wherein the crossed channels further comprise long channels and perpendicular short channels, wherein the length of the long channels is the length of the carousel and the length of the short channels is the width of the carousel, wherein the short channels are less than 92" long and the long channels are less than 130" long.

6. The carousel mount of claim 5, wherein the foldable PV panel support arms are mounted on the long channels, wherein there are two foldable PV panel support arms mounted on each long channel to allow two rows of PV panels to be mounted on the carousel, wherein the short channels are long enough to support the combined length of two or more PV panels and the long channels are greater than 105" long to minimize shading of the second row of PV panels by the first row of PV panels.

7. The carousel mount of claim 6, further comprising bypass diodes protecting horizontal cell rows so that, when the lower edge of a panel is shaded, the upper cell rows will still generate power.

8. The carousel mount of claim 1, further comprising a one-axis azimuth drive, wherein the panel tilt is fixed.

9. The carousel mount of claim 5, further comprising back module brackets mounted on the ends of foldable PV panel support arms and front module brackets mounted on long channels, wherein the back and front module brackets attach to opposite ends of mounted PV panels.

10. The carousel mount of claim 7, further comprising tether tie points, wherein the total height of the carousel is eight inches or less when the PV panel support arms are lowered.

11. A solar photovoltaic panel carousel mount comprising first and second parts, the first part having a base plate positioned on a roof, legs radiating from the base plate, a set of upward facing wheels mounted on outer ends of the legs, the second part further comprising a roof-mounted sun-tracking carousel for solar PV panels, further comprising
  an azimuth drive motor located at its center on the base plate that sits flat when the carousel is placed on the upward facing wheels,
  a rotating angle-ring with leg-out riding on top of the wheel set,
  two short channels attached to the rotating angle-ring,
  four long channels attached perpendicular to the two short channels,
  hinges and foldable PV panel support arms, two per long-channel, attached to the four long channels,
  PV panes attached to the hinges and the support arms,
  a bypass diode configuration connected to the PV panels and protecting horizontal cell rows,
  tether tie-points on the outer ends of the legs of the first part, and
  a drive bar that runs between a drive motor drive shaft at the carousel center and the long channels,
  wherein PV panels can be mounted on the PV panel support arms, which lower to reduce height of the carousel for shipping or inclement weather,
  wherein the short channels are less than 92" long and the long channels are less than 130" long.

12. The carousel mount of claim 11, wherein the total height of the carousel is nine inches or less when the PV panel support arms are lowered.

13. The carousel mount of claim 11, further comprising back module brackets mounted on the ends of foldable PV panel support arms and front module brackets mounted on long channels, wherein the back and front module brackets attach to opposite ends of mounted PV panels.

14. The carousel mount of claim 11, wherein the azimuth drive motor is a one-axis azimuth drive motor and wherein the panel tilt is fixed.

15. The carousel mount of claim 11, wherein the base with a set of wheels comprises a leg-in angle ring that the legs connect to, upon which wheels are mounted face up around a circle.

16. The carousel mount of claim 11, wherein the base with a set of wheels comprises four base plates 90° apart with a wheel facing up on each base plate.

17. The carousel mount of claim 11, further comprising wind skirts.

18. The carousel mount of claim 11, further comprising tar placed under the base with a set of wheels in order to keep the carousel from shifting in high winds.

19. The carousel mount of claim 11, further comprising bricks placed on the base with a set of wheels or the base plate in order to keep the carousel from shifting in high winds.

* * * * *